June 23, 1964  R. B. BLIZARD  3,138,219
ELECTROACOUSTIC TRANSDUCER APPARATUS
Filed July 28, 1959 4 Sheets-Sheet 1

INVENTOR.
ROBERT B. BLIZARD
BY
ATTORNEYS.

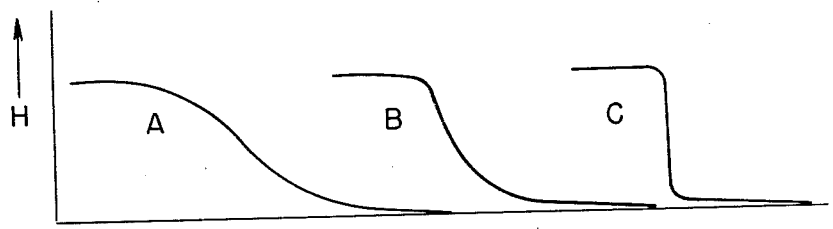
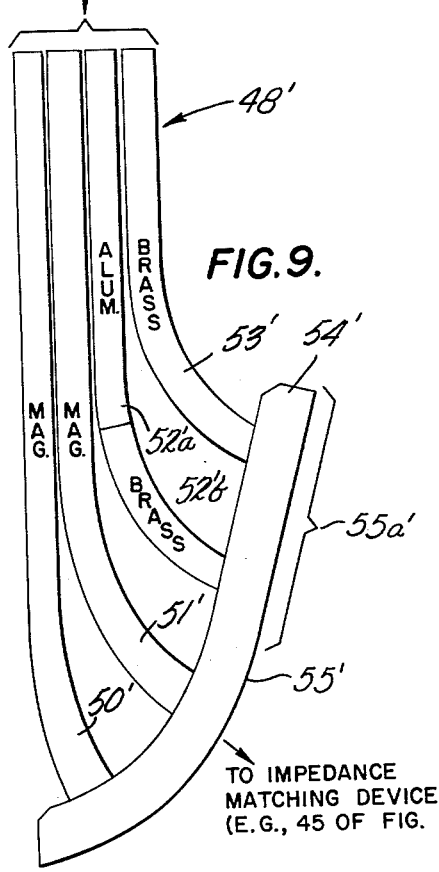
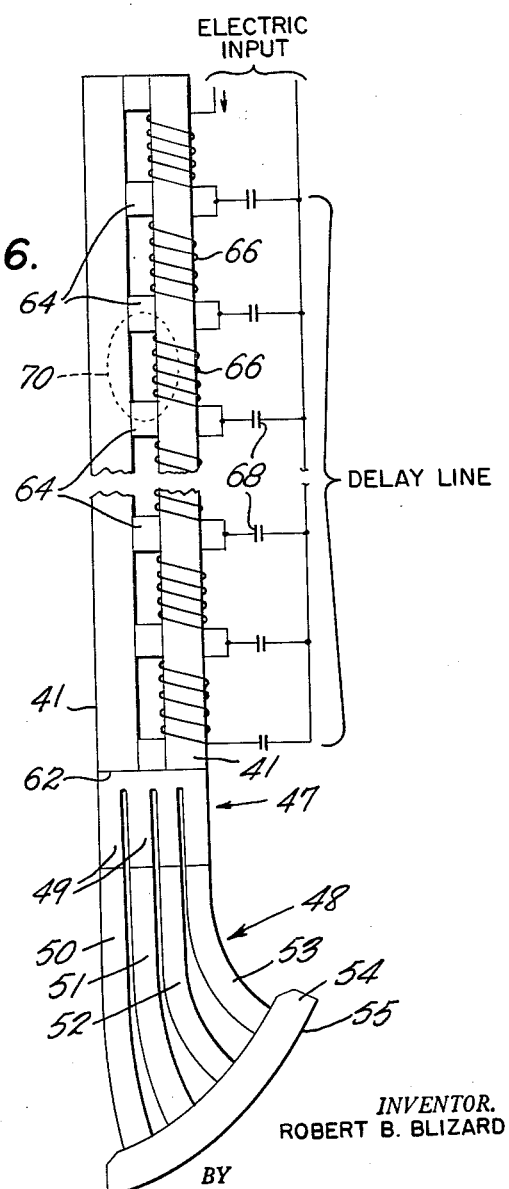

June 23, 1964  R. B. BLIZARD  3,138,219
ELECTROACOUSTIC TRANSDUCER APPARATUS
Filed July 28, 1959  4 Sheets-Sheet 4
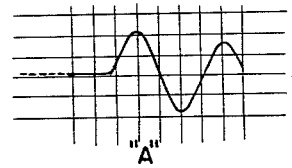
Time Scale
10 μsec/div.
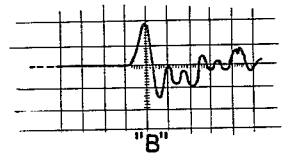
Wave form of the Prior Sonic Transmitter.
Wave form of the Delay Line Transmitter
FIG. 7.
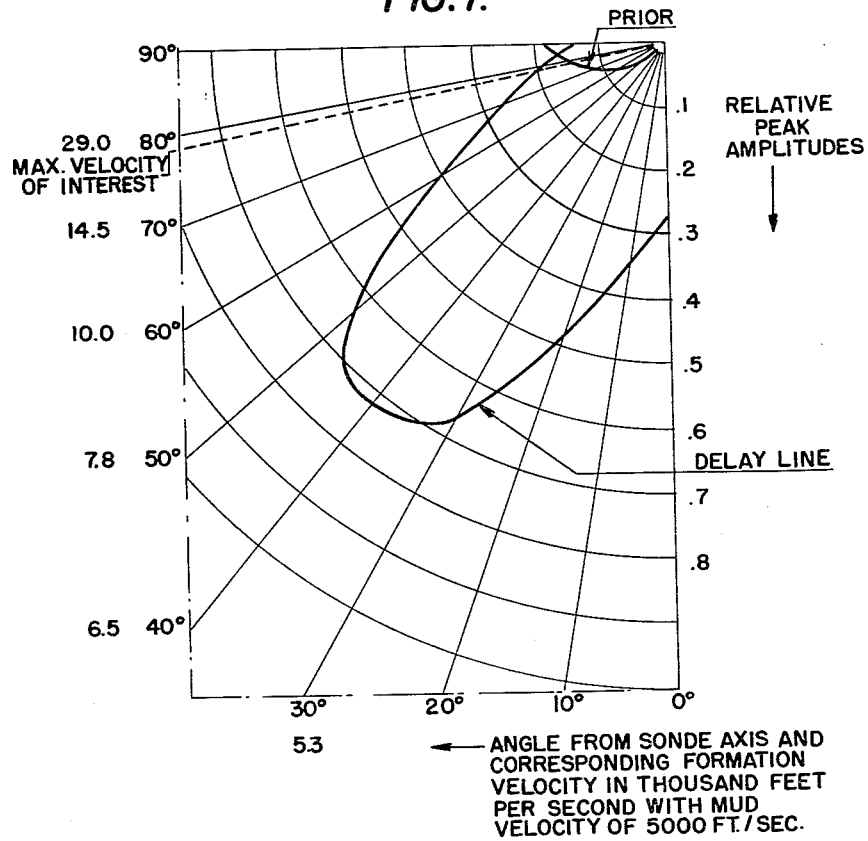
COMPARISON OF DIRECTIVITY PATTERNS AND AMPLITUDES
OF A PRIOR TRANSMITTER AND THE DELAY LINE TRANSMITTER.
FIG. 8.
INVENTOR.
ROBERT B. BLIZARD
BY
*Brumbaugh, Free, Graves & Donohue*
ATTORNEYS.

10
United States Patent Office 3,138,219
Patented June 23, 1964

3,138,219
ELECTROACOUSTIC TRANSDUCER APPARATUS
Robert B. Blizard, Houston, Tex., assignor to Schlumberger Well Surveying Corporation, Houston, Tex., a corporation of Texas
Filed July 28, 1959, Ser. No. 830,147
14 Claims. (Cl. 181—.5)

The present invention, generally, relates to electroacoustic transducer apparatus and, more particularly, to apparatus for developing impulses of acoustic energy in a bore drilled into the earth, although it is not limited to such use.

Magnetostrictive transducer apparatus has been used heretofore for generating acoustic energy in acoustic logging operations performed in wells drilled into the earth. In general, such apparatus comprises a short, hollow, cylindrical core member having a toroidal winding thereon. When a pulse of electric current is applied to the winding, the magnetostriction effect causes a pulse of acoustic energy to be radiated from the outer surface of the core member. While such apparatus is effective, it is not entirely satisfactory because the magnitude of the acoustic energy pulse that can be developed is limited by restrictions imposed on the apparatus by reason of its use in a bore.

In any given magnetostrictive transducer of this type, the amplitude of the current pulse which produces magnetic saturation of the core member is one limiting factor. Obviously, there is little to be gained by increasing the current amplitude above this value since it will not increase the acoustic output materially. Accordingly, the maximum acoustic energy output is limited primarily by the properties of the magnetostrictive material that is used.

While the acoustic energy radiated perpendicularly of the bore can be increased by increasing the length of the core, this would not result in any appreciably improved performance in logging formations having low acoustic velocity characteristics. This is because the acoustic energy necessary to log formations having low acoustic velocity characteristics should be emitted at angles up to about 70° from the normal to the axis of the bore. The bore also limits the extent to which the acoustic output can be increased by increasing the diameter of the core.

It is an object of the invention, accordingly, to provide new and improved electroacoustic transducer apparatus that is capable of producing within the confines of a bore drilled into the earth an acoustical signal of greater amplitude than has been possible heretofore.

Another object of the present invention is to provide a more efficient coupling between an electroacoustic transducer apparatus and the earth formations in the vicinity of a bore.

Yet another object of the invention is to provide an electroacoustic transducer apparatus embodying more effective coupling between the electrical and the acoustic elements of the apparatus.

A further object of the present invention is the provision of an electroacoustic transducer apparatus which permits a more effective impedance match between the acoustic transducer apparatus and the fluid in a bore.

A still further object of the invention is the provision of an electroacoustic transducer apparatus having improved directional characteristics whereby the direction of the acoustic energy output is controlled in both elevation and azimuth to permit a more effective acoustic radiation pattern.

These and other objects of the invention are attained by an electroacoustic transducer apparatus having a transducer member capable of transducing acoustical energy and energy from an electromagnetic wave, and an electrical delay line adapted to develop related electric and magnetic fields as an electromagnetic wave travels thereover, the delay line being disposed along the transducer member so that successive portions therealong are adapted to be influenced by one of said fields to produce a traveling acoustic energy wave therein. The transducer member may be made of magnetostrictive material, in which case successive portions therealong are inductively coupled to series connected increments of inductance in the delay line. Alternatively, an electrostrictive transducer member may be used, in which event successive portions therealong should be disposed in dielectric relation to shunt-connected increments of capacitance in the delay line.

The invention also contemplates the provision of novel and highly effective means for coupling the acoustic output from transducer means of the type described above to the fluid in a bore.

The invention may be better understood from the following detailed description of several representative embodiments taken in conjunction with the accompanying drawings, in which:

FIG. 3 is a graph showing the progressive development of a sharp wave front on a nonlinear delay line;

FIG. 6 illustrates another embodiment of the invention;

FIG. 7 shows typical wave forms of the acoustic energy emitted by a conventional sonic transmitter and a delay line transmitter according to the invention;

FIG. 8 is a chart showing a comparison between typical directivity patterns and amplitudes of sound waves emitted by a conventional transmitter and a transmitter in accordance with the invention;

FIG. 9 illustrates another form of acoustic radiator member for coupling acoustic transducer apparatus according to the invention to the fluid in a bore.

Figure 1:
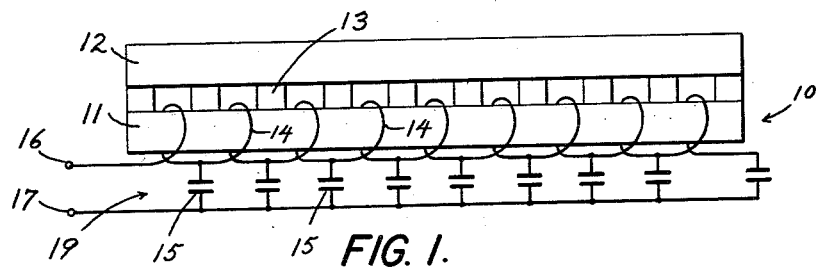
FIG. 1 illustrates magnetostrictive transducer apparatus constructed in accordance with the invention.

Referring now to FIG. 1, an electroacoustic transducer 10 comprises a pair of parallel bars 11 and 12 formed of magnetostrictive material and positioned in laterally spaced apart relation by longitudinally spaced apart magnetic shunts 13. Each of the bars 11 and 12 is substantially rectangular in cross-section and is formed of stacked laminations extending parallel to the plane of the drawing in FIG. 1 to reduce eddy current losses. In the preferred embodiment of the invention, the material of which the bars 11 and 12 are formed is the cobalt-iron alloy marketed as "2V Permendur," annealed 1.25 hours at 550° centigrade in a hydrogen atmosphere, although, of course, the invention is not limited to this material. Series connected electrical windings 14, which are part of an electrical delay line 19, are positioned about the bar 11 between adjacent magnetic shunts 13. Similar windings (not shown) may also be provided on the bar 12 to reduce effects developed by stray electrical and magnetic fields.

Each of the windings 14 forms an inductive coupling with the bar 11, and condensers 15 are connected as shown in FIG. 1 of the drawings to form a simple electrical delay line 19. Terminals 16 and 17 provide input means for electrical pulses to be applied to the delay line 19. The values of the inductances of the windings 14 and the capacitances 15 are selected in accordance with principles which will be hereinafter more fully explained to give a velocity of propagation along the delay line 19 equal to the velocity of sound in the magnetostrictive bar 11.

Figure 2:
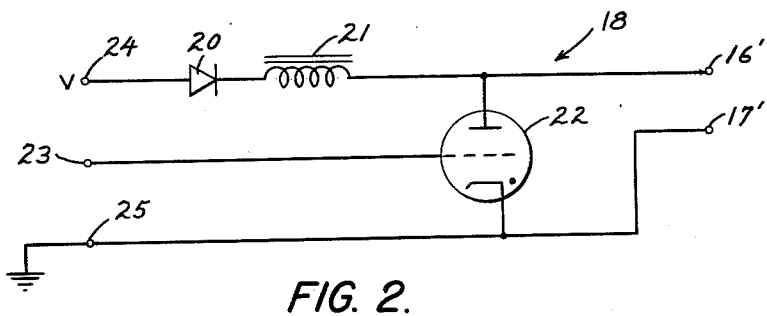
FIG. 2 illustrates schematically a typical circuit for energizing the transducer apparatus shown in FIG. 1.

The transducer may be energized by connecting its terminals 16 and 17 to the output terminals 16' and 17' of an electrical energizing circuit 18 of the type shown in FIG. 2 of the drawings. This circuit functions to charge the condensers 15 from a source of voltage V through a rectifier 20 connected electrically in series with an inductance coil 21. The rectifier 20 and inductance 21 provide resonant charging which increases the voltage on the transducer. The condensers 15 are adapted to be discharged by applying a trigger pulse to the grid 23 of a gas discharge device 22 having anode and cathode electrodes electrically connected to the terminals 16' and 17', respectively. Of course, any other suitable electrical energizing source may be employed to initiate an acoustic impulse in the bar 11.

In operation, the condensers 15 are repeatedly charged to, for example, 1.5 kv. from the source V and discharged by the gas discharge tube 22 which is triggered by pulses applied to its grid terminal 23. In this fashion, electrical pulses are applied to the transducer repetitively. Each such electric pulse will generate, by the magnetostrictive effect, a region of stress which will travel in both directions along the bars 11 and 12 continually being reinforced by interaction with the traveling electrical wave.

The velocity of propagation of the electric pulse on the electrical delay line is adjusted to equal the acoustic velocity so that all the stress impulse waves which travel along the bars in one direction reach the output end at the same time and add up to make a single pulse of large amplitude, as illustrated by the graph "B" in FIG. 7.

The impulse waves that travel in an opposite direction are reflected at the opposite ends of the bars and, then, proceed along the bars toward the output end. However, the reflected waves arrive at the output end of the bars at separate times, and they arrive after the larger pulse. These reflected waves, therefore, do not reinforce the larger pulse but, instead, form a series of smaller pulse waves which follow the larger pulse wave, as seen also in the graph "B" of FIG. 7.

Of course, the energy developed in the acoustic wave is limited by the amount of energy initially existing in the electrical wave. Therefore, after the electrical wave has delivered all of its energy to the acoustic wave, there is no further increase in the energy of the acoustic wave.

A more detailed analysis of the operation of the circuit shown in FIG. 1 indicates that the combined electrical wave and the acoustic wave form two modes of combined waves because of the coupling between the acoustic and the electrical systems, and that these two modes travel at different velocities, the amount of difference depending on the degree of coupling. Initially, the modes combine to give zero acoustic field; that is, no strain in the magnetostrictive bar at the initial condition. As the waves progress along the bar, the faster wave will take the lead and, in the region between the two wave fronts, the acoustic component of the faster wave will no longer be canceled by the acoustic component of the slower wave. The result will be a traveling and a growing region of the bar which will have an acoustic field. This growing region of the bar is the pulse of sound which is the ultimate output of the transducer.

The duration of the acoustic pulse will depend upon the coefficient of coupling between the electrical and the acoustic circuits, the length of the transducer, and the velocity of sound in the magnetostrictive bar. By way of example, for a pulse duration of 20 microseconds, the magnetostrictive transducer should preferably have a length from 50 to 100 centimeters.

Since it is desirable to have a relatively large power input to the transducer, the magnetic material is usually driven well into the nonlinear region of saturation. This is advantageous in that it maintains the wave front relatively steep even though the high frequencies are attenuated more than the low frequencies. This effect is illustrated in FIG. 3 of the drawings where the magnetizing force H is plotted versus distance along the magnetic bar for three successive intervals. At interval A, the slope of the wave front is gradual, but since the differential inductance is lower for large values of H, the velocity of propagation is greater for high values of H. Thus, the upper part of the wave travels faster than the lower part, resultig in an increased steepness similar to that encountered in shock wave phenomena. This is illustrated by the curves B and C in FIG. 3.

Assuming that the windings 14 and the capacitances 15 are evenly distributed over the length of the bar 11, analysis shows that the following relations pertaining to the delay line of the invention hold:

$$\Delta E = An\Delta Bv \quad (1)$$
$$I = c\Delta Ev \quad (2)$$
$$H = nI = nc\Delta Ev \quad (3)$$

where $\Delta B$ is the change in magnetic flux density across the shock wave;

$v$ is the velocity of propagation for the shock wave;

$n$ is the number of turns in the magnetizing coils per unit of length;

$A$ is the cross-sectional area of the bar;

$\Delta E$ is the voltage difference between the two ends of the winding, and this must be equal to the rate of change of flux linkage in the winding; and $c$ is the capacitance per unit length of the line.

Since the magnetic material is driven well into saturation, $\Delta B$ is the difference between remanence and saturation and is nearly independent of H. From Equation 1 above, therefore, it may be seen that the velocity of propagation will be proportional to $\Delta E$ and nearly independent of the amount of capacity per unit length $c$.

To determine suitable values of $n$ and $c$, a value of H is selected and then a value of $\Delta B$ is estimated. The approximate voltage is chosen, and the number of turns in the magnetizing coils per unit length $n$ is computed to make the velocity of propagation $v$, equal to the sound velocity. The capacity per unit length $c$, is selected to give the desired value of H. After assembly, the delay line is tuned by adjusting the driving voltage to give maximum acoustic output.

The transducer apparatus shown in FIG. 1 enables an acoustic impulse of large magnitude to be obtained since the magnetostrictive bar material is more efficiently used. The more efficient use develops from the better coupling which obtains between the acoustic system and the electrical system by incorporating the magnetostrictive bar or bars of the acoustic system in the electrical delay line.

Figure 4:
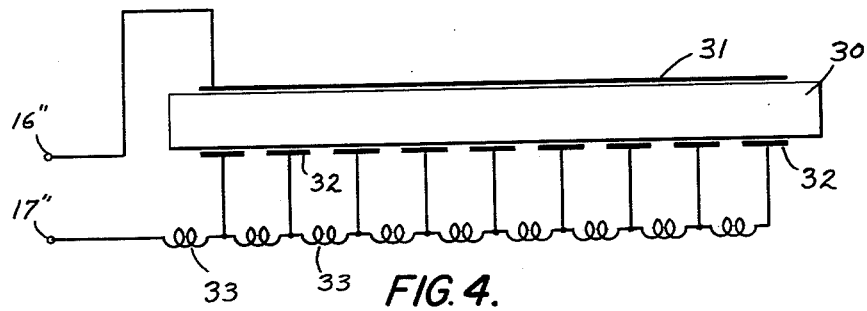
FIG. 4 illustrates electrostrictive acoustic transducer apparatus constructed according to the invention.

The invention may also be embodied in electrostrictive transducer apparatus. Thus, in FIG. 4 is shown a piezoelectric polarized bar 30 having a common electrode 31 plated onto one surface and a plurality of longitudinally spaced apart electrodes 32 plated on an opposite surface, forming with the bar 30 a plurality of electrical capacitances. A plurality of inductances 33 are connected between adjacent electrodes 32 to form, in cooperation with the bar 30, a delay line with a propagation velocity equal to the velocity of sound in the bar 30. Electrical terminals 16'' and 17'' provide means for connecting the delay line to an excitation circuit such as that described above in connection with FIG. 2. This device operates in substantially the same manner as the magnetostrictive device described above.

With either the magnetostrictive or the electrostrictive transducer, a large fraction of the electrical energy applied to the input terminals 16–17 or 16''–17'' will be converted into acoustic energy in the bar. However, to obtain the maximum benefit from this increased acoustic energy in acoustic well logging apparatus, it must be coupled to the fluid in the bore with a minimum of loss and with a suitable directivity pattern.

In considering the directivity pattern of any acoustic logging transmitter, it is important to keep in mind that the angle at which the sound should be emitted depends upon the sound velocity in the formation at the level of the transmitter. For example, in those formations in which the sound velocity is highest, the angle between the direction of the sound emitted in the mud and the axis of the bore should be arc cosine $(1/5) = 78.5°$. In the formations in which the sound velocity is lowest, on the other hand, the sound should be directed more nearly along the axis of the bore. To cover the desired range of formation velocities, therefore, the directivity pattern should extend approximately from 0° to 78.5° from the axis of the bore.

It is not necessary, however, that the intensity of the sound be constant throughout the entire range. It is more difficult to get sound into a fast formation than into a slow formation and, therefore, greater sound intensity is more desirable at the greater angles from the axis of the bore. To some extent, the requirement for sound of greater intensity at the larger angles is offset by the usually greater attenuation in the slower formations.

Figure 5:
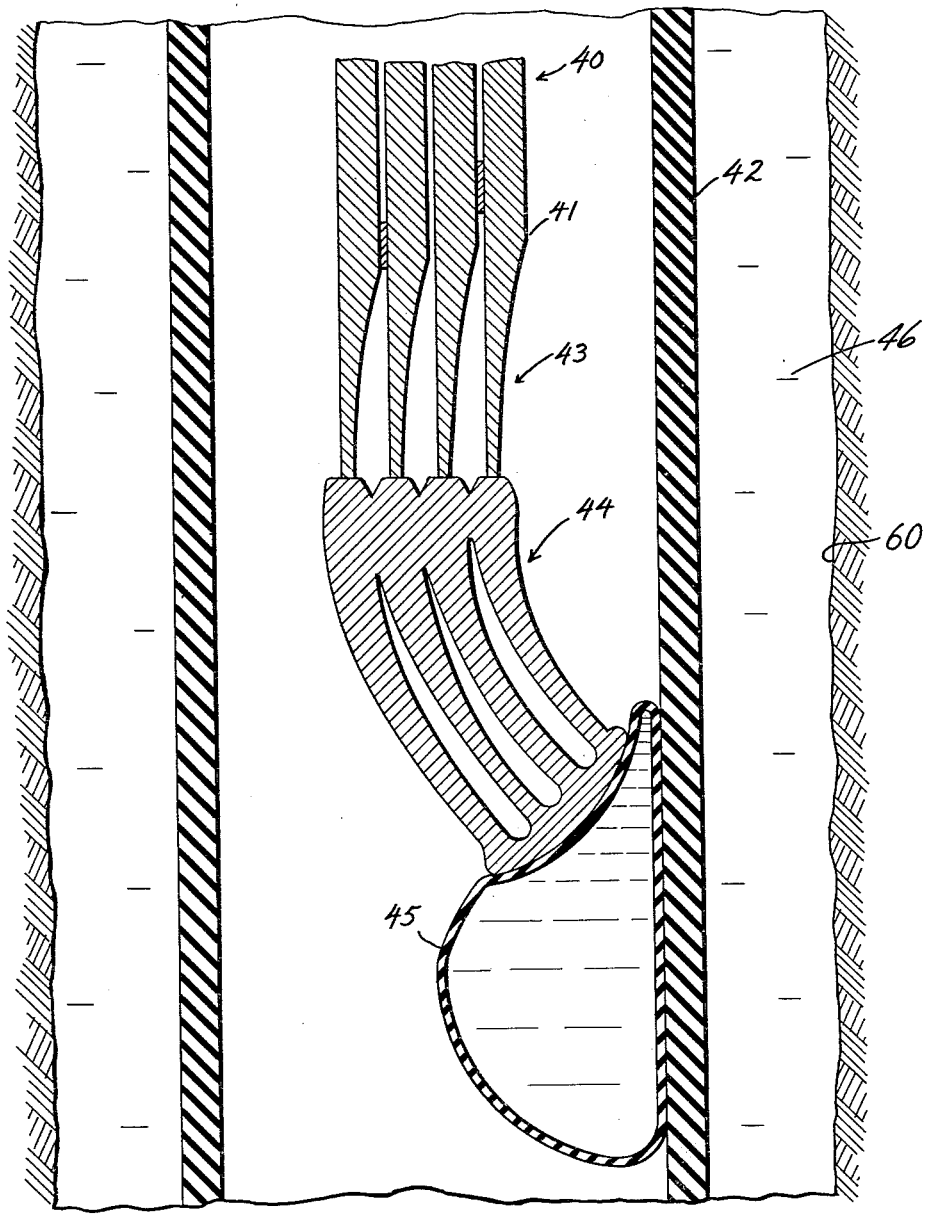
FIG. 5 is a cross-sectional partial view in elevation showing novel means for providing optimum coupling between the output of the electroacoustic transducer and the fluid in a bore.

FIG. 5 illustrates one way of coupling the acoustic energy from the transducer to the bore fluid with low loss and an effective directivity pattern according to the invention. In FIG. 5, one or more bars 40 (either magnetostrictive as in FIG. 1 or electrostrictive as in FIG. 4) are positioned longitudinally in an oil bath at well pressure within a rubber tube 42 constituting part of a well logging cartridge (not shown) disposed in the usual drilling mud 46 in a well 60 drilled into the earth. The lower end of the transducer extends into the rubber tube 42, and the upper end extends into a metallic sleeve (not shown) which shields any sound radiated directly from the bars 40.

Any number of bars may be used in the transducer, only two pairs being shown in FIG. 5 for simplicity. With the transducer bars 40 positioned vertically (longitudinally of the bore) as shown, the bar ends 41 are faced in a generally downward direction and are ground or otherwise formed into exponential horn-like portions 43 so that the high impedance of the bar material is matched to the lower impedance of a curved coupling member 44 made of a relatively light-weight material, such as magnesium. The coupling member 44 is formed of solid material in the embodiment shown in FIG. 5, and it performs the two functions of additional impedance matching and turning the path of the acoustic energy to direct it toward the wall of the bore.

A relatively thin-walled rubber bag 45 is bonded to the end of the coupling member 44 in any suitable manner and is filled with a dense fluid such as, for example, carbon tetrachloride (density—1.6 gm./ml.) or bromoform (density—2.89 gm./ml.). The bag 45 is pressed tightly against the inner wall of the rubber tube 42 and completes an acoustic energy path between the transducer bars 40 and the mud 46 in the bore. The bag 45 thus provides a sound path between the transducer and the mud which does not involve the low impedance oil or other fluid which fills the rubber tube 42.

The walls of the tube 42 are formed, preferably, of high density rubber to match the impedance of the mud in the bore. Of course, the acoustic impedance of the mud will depend upon its composition, but the median impedance for the muds usually found in bores is approximately 1.5 times the acoustic impedance of water. The tube 42 may be filled with oil having an acoustic impedance approximately equal to that of water at a pressure of 700 bars and 0.85 of this amount at 200 bars. The relatively high density of the fluid in the bag 45 reduces the amount of motion which is required to be developed by the face of the coupling member 44 in order to transmit the sound to the mud and, thus, reduces both the wasted radiation from the reverse side of the face of the curved coupling member 44 and the inertial loading of the mass of metal of which the face is formed.

The face of the coupling member 44 is preferably shaped to give desired directional properties to the radiation pattern of the transducer, and conventional means (not shown) may be provided for pressing the side of the tube 42 adjacent the end of the coupling against the wall of the bore. This enables suitable acoustic receivers (not shown) to be positioned to respond only to sound from one side of the bore, thus increasing the signal-to-noise ratio by a substantial amount.

In the form of the invention shown in FIG. 6, an impedance matching device 47 is used to couple the transducer bars 41 to the radiator member 48. The transducer is similar to that shown in FIGURE 1 and in addition to the magnetostrictive bars 41 includes a plurality of spaced apart magnetic shunts 64, forming a group of individual magnetic circuits, as indicated by the dotted loop 70. The electrical delay line comprises a plurality of series inductance elements 66 and shunt capacitances 68 in well known fashion, each of the inductance elements being wound around or otherwise in inductive relationship to individual segments of one or both of the bars 41. It will be understood, of course, that the transducer of FIGURE 4 may also be used. The impedance matching device 47 is made of a suitable material such as aluminum and it is comb-like in shape, having a plurality of legs 49 depending from a base glued or otherwise secured at 62 to the bottom ends of the transducer bars 41.

The radiator member 48 is made of a suitable material such as magnesium and it comprises a plurality of curved arms 50, 51, 52 and 53 secured at their upper ends to the lower ends of the legs 49 of the impedance matching device 47 and at their lower ends to a member 54 having a curved radiating surface 55. The curved arms 50, 51, 52 and 53 serve to change the direction of the particle velocity to make it normal to the radiating surface 55. It is a property of curved bars such as arms 50–53, that they will not transmit (carry) longitudinal waves of frequency less than a cut-off frequency $C/2\pi R$ where C is the velocity of longitudinal waves on a straight bar of the same material, and R is the radius of curvature. It is undesirable to work near this cut-off frequency because dispersion tends to mar the pulse shape, and the curved arms tend to develop an increasingly large lateral motion which will radiate energy into the bore liquid. For example, in a practical device, the shortest arm 53 may have a mean radius of curvature of 2.4 inches (61 mm.), the cut-off frequency being 13 kilocycles per second for magnesium.

The impedance matching device 47 and the radiator member 48 should both be designed for proper acoustic impedance matching in accordance with known engineering principles. By way of example, if the acoustic impedance ratio at each of the three discontinuities between the transducer bars 41 and the impedance matching device 47, between the legs 49 of the latter and the arms 50, 51, 52 and 53 of the radiator member 48, and between the arms 50, 51, 52 and 53 and the radiator surface 55 is made 0.68, the total acoustic energy loss will be only about 10%.

The electroacoustic transducer apparatus described above may be expected to provide an increase in effective power output as much as ten times the output of apparatus heretofore known. As pointed out previously, this is accomplished by providing a better coupling between the electrical and the acoustic elements of the transducer and by providing a better coupling between the output of the transducer and the surrounding fluid within a bore.

An important advantage of the sonic delay line transmitter of the invention is that it concentrates almost all of the sound energy in a single pulse at the beginning of the wave series (graph "B" of FIG. 7) in contrast with prior sonic transmitters which provide a wave train output having a plurality of peaks, as illustrated in graph "A" of FIG. 7.

It will be apparent, therefore, that when the delay line transmitter of the invention is used with conventional sonic receiver apparatus set to respond to the first-received positive pulse, the indicated time of arrival of the wave at the receiver will be much closer to the so-called "first arrival" than the indicated time of arrival obtained when a conventional sonic transmitter having an output wave of the form shown in the graph "A" of FIG. 7 is used.

Moreover, the directivity pattern of the signal output from a transmitter of the type shown in FIG. 6 is a considerable improvement over the directivity pattern of the signal output from a conventional transmitter of the type described above, as shown by the graph in FIG. 8. It will be noted that the peak amplitude for the delay line transmitter occurs at about 40° to the axis of the bore, and that over most of the range of angles corresponding to the formation velocities encountered in logging, the amplitude of the emitted pulse is substantially greater than it is in conventional sonic transmitter apparatus.

The directivity pattern of the emitted sound in directions at larger angles (i.e., above about 60°) to the axis of the bore may be improved by utilizing a radiator 48' of the type shown in FIG. 9 of the drawings. In this form of the invention, the shorter arms of the radiator member are made of a material having a lower sound velocity than the others so that smaller radii of curvature may be used. For example, if the shortest arm 53' is made of brass for which the sound velocity is about two-thirds the velocity in magnesium, the radius of curvature may be reduced from 2.4 inches to 1.6 inches.

The second shortest arm may have a straight portion 52'a of aluminum and a curved portion 52'b of brass, also having a reduced radius of curvature. The lengths of the brass portions 53' and 52'b are selected to delay the sound just enough to make it arrive simultaneously at the ends of the arms 51', 52'b and 53'. The arms 51' and 50' are almost the same in length, so that no correction is needed.

By constructing the radiator member arms in this manner, the radiator member can be provided with a radiating surface 55' having a large flat portion 55a' which is normal to a line making large angle with the axis of the bore. As a result, the performance of the acoustic radiator at large angles with respect to the axis of the bore is materially improved.

If an exponentially tapering coupling member is used, it is necessary for the important components of the pulses to be of a somewhat higher frequency than the cutoff frequency which is known to be proportional to the normal velocity of sound in the energy-carrying medium.

The invention thus provides novel and improved electroacoustic transducer apparatus which has particular utility in acoustic well logging operations. By virtue of the transducer structure described, improved coupling between the electrical and acoustic components is achieved so that the efficiency of generation of the acoustic energy is high. Moreover, by reason of the exponential horn-type coupling used, the acoustic impedances may be properly matched for maximum acoustic energy transfer to the surrounding medium, while the directional properties of the transducer can be controlled in elevation and in azimuth to give a highly efficient radiation pattern.

The invention may be embodied in other specific forms without departing from the essential characteristics thereof. Hence, the present embodiments are to be considered in all respects as merely illustrative and not as being restrictive, the scope of the invention being indicated by the appended claims.

I claim:

1. An electroacoustic transducer apparatus for developing impulses of acoustic energy in earth formations in the vicinity of a bore containing fluid comprising acoustic transducer means for producing and propagating acoustic output pulses longitudinally of the bore, electrical circuit means operatively connected with said transducer means and including inductance and capacitance for energizing said acoustic transducer means, whereby a pulse of electrical energy traveling through said electrical circuit means develops a traveling acoustic pulse in said acoustic transducer means directed longitudinally of the bore, said acoustic pulse being continually reinforced in magnitude by said traveling electrical pulse, and coupling means connected to said acoustic transducer means to receive the output thereof for coupling said acoustic pulses with earth formations, said coupling means comprising a plurality of curved members at least some of which are formed of different materials, and said members being formed with different radii of curvature to turn said pulses at a predetermined angle with the longitudinal axis of said bore.

2. An electroacoustic transducer apparatus for developing impulses of acoustic energy in earth formations in the vicinity of a bore containing fluid comprising acoustic transducer means having spaced apart bars of magnetostrictive material extending longitudinally of the bore for producing acoustic output pulses, electrical circuit means operatively connected with said transducer means and including inductance and capacitance coupled to at least one of said spaced apart bars for energizing said acoustic transducer means whereby a pulse of electrical energy traveling through said electrical circuit means develops an acoustic pulse in said acoustic transducer means travelling in a direction substantially parallel to the axis of said bore, said acoustic pulse being continually reinforced in magnitude by said traveling electrical pulse, and coupling means including a plurality of curved members some of which are formed of different materials and with different radii of curvature connected to said transducer means to receive the output thereof for changing the direction of said pulses relative to the axis of said transducer means, said members terminating in a common output portion, and means connected to said portion and responsive to said pulses for providing a substantially high-density acoustic path for said directed pulses to the fluid in the bore.

3. An electroacoustic transducer apparatus for developing impulses of acoustic energy in earth formations in the vicinity of a bore containing fluid comprising acoustic transducer means having spaced apart bars of magnetostrictive material extending longitudinally of the bore for producing acoustic output pulses, a plurality of magnetic shunts connecting said bars of magnetostrictive material and spaced apart therealong, electrical circuit means operatively connected with said transducer means, said electrical circuit means including inductive elements coupled with at least one of said bars at predetermined locations intermediate of said magnetic shunts and capacitance for energizing said acoustic transducer means, whereby a pulse of electrical energy traveling through said electrical circuit means develops an acoustic pulse in said acoustic transducer means in a direction substantially parallel to the axis of said bore, said acoustic pulse being continually reinforced in magnitude by said traveling electrical pulse, and coupling means including a plurality of curved spaced-apart arms connected to one end thereof to said transducer means to receive the output thereof, at least some of said arms being formed of different materials and with different radii of curvature for changing the direction of said acoustic pulses relative to said direction, and means connected to the other ends of said arms and responsive to directed acoustic pulses for providing a dense acoustic sound path between said transducer means and the fluid in the bore.

4. An electroacoustic transducer apparatus for developing impulses of acoustic energy in earth formations in the vicinity of a bore containing fluid comprising acoustic transducer means having spaced apart bars of magnetostrictive material extending longitudinally of the bore for producing acoustic output pulses, a plurality of magnetic shunts connecting said bars of magnetostrictive material and spaced apart therealong, electrical circuit means operatively connected with said transducer means, said electrical circuit means including a plurality of coils positioned in inductive relation with at least one of said bars at predetermined intervals therealong and capacitance for energizing said acoustic transducer means, whereby a pulse of electrical energy traveling through said electrical circuit means develops an acoustic pulse in said acoustic transducer means in a direction substantially parallel to the axis of said bore, said acoustic pulse being continually reinforced in magnitude by said traveling electrical pulse, and coupling means including a plurality of spaced-apart curved arms connected at one end thereof to said transducer means to receive the output thereof, a radiating surface displaced from the longitudinal axis of said transducer means connected to the other ends of said arms for changing the direction of said acoustic pulses relative to the axis of said transducer means, and means connected to said radiating surface and responsive to directed acoustic pulses providing a substantially dense acoustic sound path between the radiating surface and the fluid in the bore.

5. An electroacoustic transducer apparatus for developing impulses of acoustic energy in earth formations in the vicinity of a bore containing fluid comprising acoustic transducer means having spaced apart bars of magnetostrictive material extending longitudinally of the bore for producing acoustic output pulses, a plurality of magnetic shunts connecting said bars of magnetostrictive material and spaced apart therealong, electrical circuit means operatively connected with said transducer means, said electrical circuit means including a plurality of coils positioned in inductive relation with at least one of said bars at predetermined intervals therealong and capacitance connected in shunt between adjacent ones of said coils for energizing said acoustic transducer means, whereby a pulse of electrical energy traveling through said electrical circuit means develops an acoustic pulse in said acoustic transducer means in a direction substantially parallel to the axis of said bore, said acoustic pulse being continually reinforced in magnitude by said traveling electrical pulse, and coupling means including a plurality of spaced-apart curved arms connected together at one end and to said transducer means to receive the output thereof, and a radiating surface displaced from the longitudinal axis of said transducer means connected to the other ends of said arms, said curved arms being effective to change the direction of said acoustic pulses from a direction substantially parallel to the axis of said bore to a direction to said radiating surface.

6. An electroacoustic transducer apparatus for developing impulses of acoustic energy in earth formations in the vicinity of a bore containing fluid comprising acoustic transducer means having at least one bar of electrostrictive material extending longitudinally of the bore for producing acoustic output pulses, electrical circuit means disposed in electrically driving relation to said electrostrictive bar for energizing said acoustic transducer means, said electrical circuit means including inductance and capacitance, whereby a pulse of electrical energy traveling through said electrical circuit means develops a traveling acoustic pulse in said acoustic transducer means, said acoustic pulse being continually reinforced in magnitude by said traveling electrical pulse, and coupling means connected to said acoustic transducer means to receive the output thereof for coupling said acoustic pulses with earth formations, said coupling means comprising a plurality of curved members at least some of which are formed of different materials and with different radii of curvature to turn the acoustic pulses at a predetermined angle with the longitudinal axis of said bore, said different materials determining the velocity of said acoustic pulses in said members.

7. An electroacoustic transducer apparatus for developing impulses of acoustic energy in earth formations in the vicinity of a bore containing fluid comprising acoustic transducer means having at least one bar of electrostrictive material extending longitudinally of the bore for producing acoustic output pulses, electrical circuit means disposed in electrically driving relation to said electrostrictive bar for energizing said acoustic transducer means, said electrical circuit means including inductance and capacitance, a plurality of individual capacitors connected in shunt in said electrical circuit and a plurality of coils connected between adjacent ones of said capacitors, whereby a pulse of electrical energy traveling through said electrical circuit means develops a traveling acoustic pulse in said acoustic transducer means, said acoustic pulse being continually reinforced in magnitude by said traveling electrical pulse, and coupling means connected to said acoustic transducer means to receive the output thereof for coupling said acoustic pulses with earth formations, said coupling means comprising a plurality of curved members at least some of which are formed of different materials and with different radii of curvature to turn the acoustic pulse at a predetermined angle with the longitudinal axis of said bore, the sound velocity in said members varying with the radii of curvature.

8. An electroacoustic transducer apparatus for developing impulses of acoustic energy in earth formations in the vicinity of a bore containing fluid comprising acoustic transducer means for producing acoustic output pulses, electrical circuit means connected to said acoustic transducer means and including inductance and capacitance for energizing said acoustic transducer means, said acoustic transducer means being formed of at least one bar of piezoelectric material extending longitudinally of the bore, said acoustic transducer means being coupled in dielectric relation to said capacitance whereby a pulse of electrical energy traveling through said electrical circuit means develops a traveling acoustic pulse in said acoustic transducer means, said acoustic pulse being continually reinforced in magnitude by said traveling electrical pulse, and coupling means including a plurality of spaced-apart curved arms connected together at one end and to said transducer means to receive the output thereof, a radiating surface displaced from the longitudinal axis of said transducer means connected to the ends of said arms, said arms being effective to change the direction of said acoustic pulses to the normal to said radiating surface, and an envelope containing a dense fluid connected to said radiating surface for coupling said acoustic pulses to the fluid in the bore.

9. An electroacoustic transducer apparatus for developing impulses of acoustic energy in earth formations in the vicinity of a bore containing fluid comprising acoustic transducer means extending longitudinally of the bore for producing acoustic output pulses, electrical circuit means connected to said acoustic transducer means and including inductance and capacitance as an operative component part of said acoustic transducer means to develop acoustic pulses, acoustic pulse coupling means having an input end and an output end comprising a solid portion displaced from the longitudinal axis of said acoustic transducer means for changing the direction of acoustic pulses relative to the axis of said transducer means, means connected to said acoustic transducer means and the input end of said coupling means for matching the impedance between the output end of said acoustic transducer means and said input end of said acoustic pulse coupling means, a thin-walled envelope enclosing a dense fluid positioned against said solid portion for matching the impedance between said portion and the earth formations, a housing for containing said apparatus and adapted to be lowered into a well, said housing having a wall portion formed of flexible material, said fluid-filled envelope being positioned intermediate of said solid portion and said resilient portion of said housing wall.

10. An electroacoustic transducer apparatus for developing impulse of acoustic energy in earth formations in the vicinity of a bore containing fluid, comprising elongated acoustic transducer means for producing and propagating acoustic impulses longitudinally of the bore, electrical delay circuit means including inductance and capacitance coupled to said transducer means to incorporate said transducer means into said delay circuit, whereby the characteristics of the latter are dependent in part upon the transducer means, means for applying a pulse of electrical energy to said delay circuit to develop a traveling acoustic pulse in said acoustic transducer means and directed longitudinally of the bore, said acoustic pulse being continually reinforced in magnitude by said traveling electrical pulse, and means acoustically coupled to one end of said acoustic transducer means for coupling said acoustic pulse with the fluid in the bore, said coupling means defining a transmission path for changing the direction of propagation of said acoustic pulse.

11. An electroacoustic transducer apparatus for developing impulse of acoustic energy in earth formations in the vicinity of a bore containing fluid, comprising elongated acoustic transducer means disposed in said bore and generally parallel to the axis thereof for producing and propagating acoustic impulses longitudinally of the bore, electrical delay circuit means including inductance and capacitance coupled to said transducer means to incorporate said transducer means into said delay circuit, whereby the characteristics of the latter are dependent in part upon the transducer means, means for applying a pulse of electrical energy to said delay circuit to develop an acoustic pulse in said acoustic transducer traveling in a direction substantially parallel to the axis of said bore, said acoustic pulse being continually reinforced in magnitude by said traveling electrical pulse, and means acoustically coupled to one end of said acoustic transducer means for coupling said acoustic pulse with the fluid in the bore, said coupling means defining a transmission path for turning said acoustic pulse at a predetermined angle with the axis of said bore.

12. For use with apparatus for applying pulses of acoustic energy to a medium, an electroacoustic transducer comprising a pair of spaced-apart bars of magnetostrictive material, a plurality of magnetic shunts connecting said bars and spaced apart therealong to effectively form a plurality of individual magnetic circuits, an electrical delay line including a plurality of series inductive elements and shunt capacitances, each of said inductive elements being in inductive relationship to a separate one of said magnetic circuits, and means for applying an electrical pulse to said delay line of sufficient magnitude to saturate said magnetic circuits.

13. In apparatus for applying impulses of acoustic energy to a medium, said apparatus including electroacoustic transducer apparatus for developing an acoustic impulse propagating in a given direction, an elongated radiating element disposed at an angle to said given direction, and a plurality of arms of acoustic energy conducting material coupled between said transducer apparatus and said radiating element, each of said arms extending in said given direction adjacent said transducer apparatus and then curving to meet said radiating element substantially normal thereto, the radii of curvature of the curved portions of said elements being large enough to establish cut-off frequencies in said arms sufficiently high to minimize distortion of said acoustic impulse.

14. The apparatus of claim 13 above, wherein said arms are made of materials having different velocities of acoustic propagation and the lengths of the respective arms and the materials thereof are chosen to enable said acoustic impulse to reach all portions of said radiating element in substantially the same phase.

References Cited in the file of this patent
UNITED STATES PATENTS

| | | |
|---|---|---|
| 2,668,529 | Huter | Feb. 9, 1954 |
| 2,699,061 | Drake | Jan. 11, 1955 |
| 2,717,981 | Apstein | Sept. 13, 1955 |
| 2,806,155 | Rotkin | Sept. 10, 1957 |
| 2,825,044 | Peterson | Feb. 25, 1958 |
| 2,891,180 | Elmore | June 16, 1959 |
| 2,913,602 | Joy | Nov. 17, 1959 |
| 2,921,134 | Greenspan et al. | Jan. 12, 1960 |

FOREIGN PATENTS

| | | |
|---|---|---|
| 745,611 | France | Feb. 21, 1933 |
| 640,489 | Great Britain | Apr. 22, 1953 |
| 750,125 | Great Britain | June 13, 1956 |

OTHER REFERENCES

Publication: Wireless World, vol. 60, No. 9, September 1954, pages 448–450.

UNITED STATES PATENT OFFICE
CERTIFICATE OF CORRECTION

Patent No. 3,138,219                              June 23, 1964

Robert B. Blizard

It is hereby certified that error appears in the above numbered patent requiring correction and that the said Letters Patent should read as corrected below.

Column 12, line 42, for "640,489" read -- 690,489 --.

Signed and sealed this 27th day of October 1964.

(SEAL)
Attest:

ERNEST W. SWIDER                              EDWARD J. BRENNER
Attesting Officer                                  Commissioner of Patents

UNITED STATES PATENT OFFICE
CERTIFICATE OF CORRECTION

Patent No. 3,138,219

June 23, 1964

Robert B. Blizard

It is hereby certified that error appears in the above numbered patent requiring correction and that the said Letters Patent should read as corrected below.

Column 12, line 42, for "640,489" read -- 690,489 --.

Signed and sealed this 27th day of October 1964.

(SEAL)
Attest:

ERNEST W. SWIDER
Attesting Officer

EDWARD J. BRENNER
Commissioner of Patents